(12) United States Patent
Lundin et al.

(10) Patent No.: US 7,660,586 B2
(45) Date of Patent: Feb. 9, 2010

(54) SYSTEM AND METHOD RELATING TO MOBILITY IN A MOBILE COMMUNICATION SYSTEM

(75) Inventors: Niklas Lundin, Torslanda (SE); Anders Åhlén, Göteborg (SE); Anders Henriksson, RÅÅ (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 580 days.

(21) Appl. No.: 10/596,943

(22) PCT Filed: Dec. 30, 2003

(86) PCT No.: PCT/EP03/14953

§ 371 (c)(1),
(2), (4) Date: Jun. 29, 2006

(87) PCT Pub. No.: WO2005/064954

PCT Pub. Date: Jul. 14, 2005

(65) Prior Publication Data

US 2007/0091877 A1   Apr. 26, 2007

(51) Int. Cl.
*H04Q 7/20* (2006.01)
(52) U.S. Cl. .................... 455/445; 455/422.1; 370/352; 370/353
(58) Field of Classification Search ................ 455/445, 455/422.1, 426.1, 560, 466, 550.1, 552.1; 370/352–357, 360, 386, 400
See application file for complete search history.

(56) References Cited

U.S. PATENT DOCUMENTS

| 6,505,044 | B1 | 1/2003 | Heikki et al. | |
| 6,937,862 | B2 * | 8/2005 | Back et al. | 455/445 |
| 7,023,855 | B2 * | 4/2006 | Haumont et al. | 370/395.1 |
| 7,342,933 | B2 * | 3/2008 | Tsao | 370/401 |
| 7,551,583 | B1 * | 6/2009 | Gazzard | 370/331 |
| 2002/0064144 | A1 * | 5/2002 | Einola et al. | 370/335 |
| 2002/0150084 | A1 * | 10/2002 | Lee et al. | 370/352 |
| 2003/0153296 | A1 * | 8/2003 | Mueller | 455/403 |

FOREIGN PATENT DOCUMENTS

| EP | 1 313 340 A | 5/2003 |
| EP | 1 335 619 A | 8/2003 |

* cited by examiner

*Primary Examiner*—Creighton Smith (57) ABSTRACT

The present invention relates to a communication system supporting data communication and comprising at least a first core network with a plurality of circuit switched (CS) core network functional server nodes and a second core network with a number of packet switched (PS) core network functional sever nodes for packet switched communication. The CS core nodes are arranged in a pool and an interface (Gs) between CS core nodes and PS core nodes is used for providing information to CS core nodes from PS core nodes relating to mobility related events provided from an MS to a PS core node. When a mobile station moves from a first CS core node to a second CS core node the PS core node to which the MS is connected is provided with information relating to the change from said first to said second CS core node.

21 Claims, 5 Drawing Sheets

SYSTEM AND METHOD RELATING TO MOBILITY IN A MOBILE COMMUNICATION SYSTEM

FIELD OF THE INVENTION

The present invention relates to a communication system which supports communication of data and which comprises a first core network with a plurality of core network functional server nodes for circuit switched communication, also called CS core nodes, and a second core network with a number of core network functional server nodes for packet switched communication, also called PS core nodes. At least the CS core nodes are arranged in a pool in order to in common control a number of control nodes and an interface between CS core nodes and PS core nodes is used e.g. for providing information to CS core nodes from the PS core nodes relating to mobility related events for mobile stations. The invention also relates to a PS core node in such a system, to a CS core node in such a system, to a home location node in such a system and to a method for transfer of information messages in a system as referred to above.

STATE OF THE ART

Figure 1A:
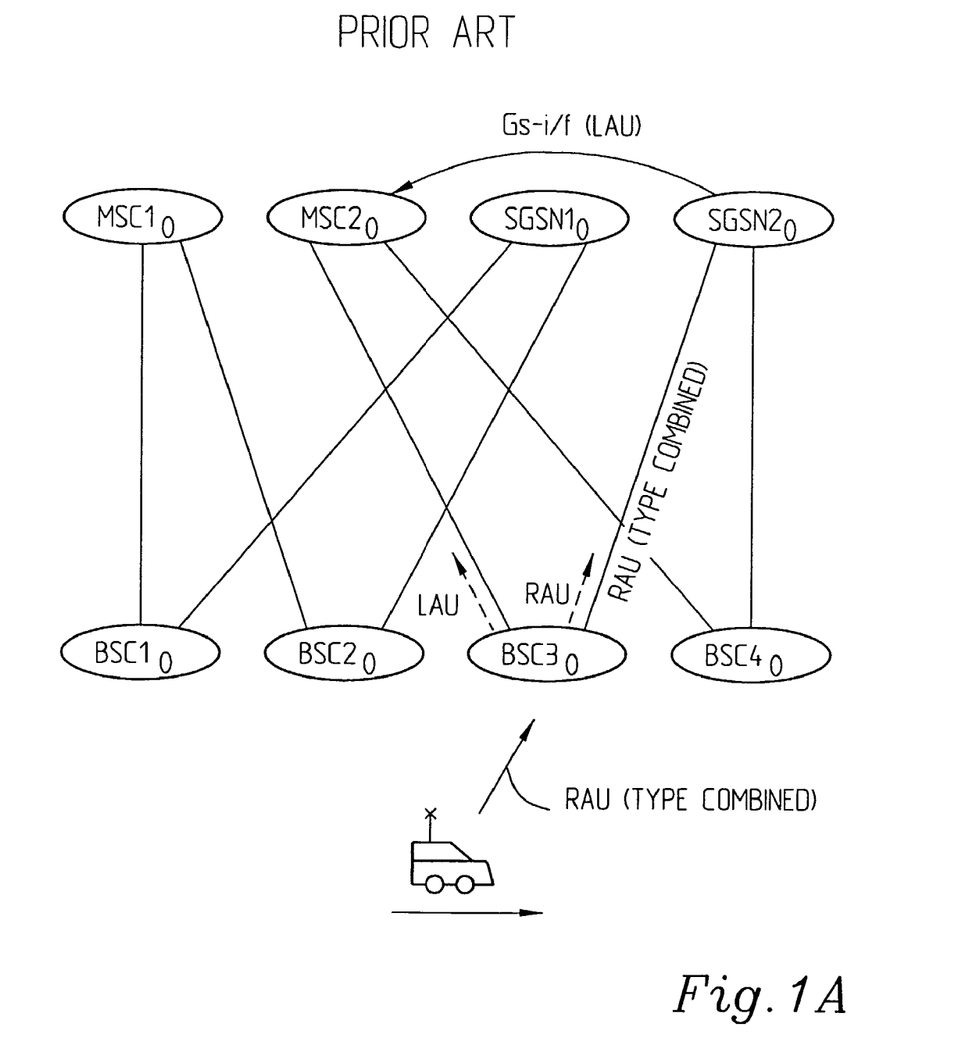
FIG. 1A shows;- A network block diagram illustrating circuit switched core nodes and packet switched core nodes both controlling radio access network.

In known communication systems supporting communication of both circuit switched data and packet switched data, as also very schematically illustrated in the prior art FIG. 1, circuit switched core nodes, here MSC 1 and MSC 2 and packet switched core nodes, here SGSN 1 and SGSN 2 serve, or control, radio access network control means, here base station controllers BSC 1, BSC 2, BSC 3, BSC 4, each responsible for routing areas or location areas RA/LA etc. It should be clear that the figure is most simplified and shown for illustrative purposes. Before the pooling concept was introduced, i.e. without pooling, each BSC communicated with but one CS core node and one PS core node, here each BSC communicates with one MSC and one SGSN. If a mobile station MS changes routing area or location area, for example between BSC 2 and BSC 3, the MSC has to be changed from the MSC 1 to MSC 2 since BSC 2 communicates with MSC 1 and BSC 3 only with MSC 2. The MS then sends a location area updates (LAU) to the MSC (corresponding to a routing area update (RAU) for packet switched communication). But it also means that it has to change SGSN, e.g. from SGSN 1 to SGSN 2 in this case. This means that quite lot of signalling is required, and there has to be sent one message to an MSC, one message to an SGSN and a response or accept has to be awaited from both. The procedure is similar upon attach, for example if a mobile station within a routing area or a service area is not moving but is activated in the area. In order to, among others, reduce the required signalling a feature denoted combined procedures has been standardized, it is also called Network Operation Mode 1. In short this includes the introduction of an interface, the Gs interface, between the SGSN and the MSC. An advantage with this feature is that only one message is required from the MS. The MS then instead sends a RAU of type combined to the SGSN. (For example via broadcast the MS is able to note whether the network supports RAU of type combined to an SGSN. The SGSN then "converts" the RAU to a LAU which is sent over the Gs interface to the concerned MSC (of course on condition that the concerned MSC and SGSN respectively cover the same routing/location area or service area. A benefit of using the Gs interface is that CS paging can be coordinated in the BSC and that mobility procedures such as attach and routing/location area updates can be handled with a minimum amount of signalling over the air. All mobility related signalling passes between MS and the SGSN and, as referred to above, the SGSN then uses the Gs interface to notify the MSC of the current mobility events. It should here be pointed out that, when the Gs interface is active, selection of an MSC is done by the SGSN and not by the BSC as it is otherwise the case. The Gs interface and combined procedures are described in 3GPP (Third Generation Partnership Project) TS 29.018 and 29.016 which herewith are incorporated herein by reference thereto.

If however an MSC has been taken down e.g. because it was malfunctioning for regular maintenance reasons or similar, and then it is activated or put into traffic again, it will not be aware of which MSs it should control. Therefore implementation of the pooling concept is a precondition for a good functioning. Pooling of core nodes, e.g. MSCs and SGSNs has been standardized in 3GPP TS 23.236 Release 5, which also is incorporated herein by reference thereto. The pooling concept consists in that several MSCs or SGSNs serve one and the same area, i.e. serve the control nodes and the respective areas in common. This means that any core node, in a pool is able to control any control node, e.g. BSC or RNC, in the pool area. This makes it possible, for example, to remove an MSC or an SGSN for service or maintenance purposes and still retain the service availability. It is also easier to add core nodes, MSCs or SGSNs, to the pool with a minimum impact on the pool and on control nodes since the responsibility is taken over by another core node within the pool. Pooling is also attractive from load sharing and redundancy point of views. When an MS is attached to a pooled MSC/SGSN, it is allocated a temporary identity, TMSI (Temporary Mobile Station Identity) or P-TMSI (Packet-TMSI). (P-)TMSI) includes an NRI (Network Resource ID) that uniquely defines the node in the pool, which is used by the radio access network control node, i.e. BSC or RNC, to route the MS to the correct MSC/SGSN. When the feature combined procedures, or the Gs interface, is used together with pooled MSCs, the responsibility for selection of MSC is transferred to the SGSN. According to the current standards, the SGSN shall select MSC based on IMSI. If for example a BSC, e.g. BSC 3, is served by SGSN 2, a RAU of type combined is sent from BSC 3 to SGSN 2 which then sends a LAU to an MSC. The selection of MSC is based on IMSI when SGSN selects MSC. If, however, the MS has changed MSC, for example due to maintenance or malfunctioning of an MSC, to another MSC, allocation depending on IMSI will not function. All SGSNs have to use the same algorithm or allocation algorithm in order to assure that a MS does not have to change MSC when it changes SGSN. Thus, if there has been a change in MSC, with the present solution, it will not function. It is however disadvantageous to change MSC selection just because an MSC has been taken down, e.g. for algorithm due to maintenance etc. This is particularly problematic when the MSCs are pooled and the SGSNs are not pooled, or the SGSN pool area differs from that of the MSC pool area, since the MSC selection or selection algorithm has to be the same in all SGSNs to avoid change of MSCs SGSN change as referred to above, i.e. all SGSNs have to choose the same MSC for a mobile station.

In many cases, e.g. at MSC restart after a planned maintenance, there is a need to have a more dynamic load sharing of MSs on MSCs. If the SGSNs are aware that a certain MSC has been restarted, or if there is a new MSC in the MSC pool, an active load balancing can be performed in order to quickly redistribute the load also on the new MSC. With the current solution this would have to be performed using a coordinated change of the IMSI based MSC selection algorithm, which means that the consequences of even a planned operation will result in extensive changes and signalling.

In another situation MSCs apparently can move MSs to other MSCs on their own initiatives before a maintenance situation. In that case the SGSN to which the MS is attached is not notified. When the MS notices the situation, a re-attach will occur, and the SGSN will use its IMSI based algorithm to select an MSC, which in most cases will lead to a change of MSC, which is disadvantageous.

Thus, with the current solutions there will be unnecessary changes of core nodes as a mobile station moves, as well as there is required a lot of signalling in a network. Another situation that is problematic is when an MS has changed MSC, and then moves from one SGSN to another. The "new" SGSN then has to select an MSC and accordingly uses the IMSI algorithm, e.g. an IMSI table, and for example selects MSC 1. However, if the MS had moved from the MSC 1 to another MSC, e.g. MSC 2, or if MSC 1 is out of operation or even if it has been taken into operation after maintenance or similar, the MS will be controlled by another MSC but this is not known to the new SGSN, i.e. the IMSI algorithm will point at the wrong MSC, which is clearly disadvantageous.

SUMMARY OF THE INVENTION

What is needed is therefore a communications system as initially referred to in which signalling can be reduced. Still further a communications system is needed through which unnecessary changes of the attachment of a mobile station to core nodes can be avoided in general. Moreover a system is needed through which pooling of core nodes can be taken advantage of to a better extent than hitherto, particularly pooling of CS core nodes. Still further a system is needed through which the disadvantages referred to above when pooling is used in combination with the feature combined procedures or network operation mode 1 can be overcome. Further yet a system is needed through which maintenance of pooled CS core nodes, particularly MSCs, is facilitated when the Gs interface is active, or when combined procedures or Network Operation Mode I is implemented. Still further a system is needed through which changes of core nodes can be avoided when for example a CS core node in a pool crashes, or when a new CS core node, particularly an MSC, is introduced in a network or when an MSC is down for maintenance reasons etc. Still further a system is needed through which the rigidity and inflexibility of using MSC algorithms for selection of an MSC via an SGSN can be avoided and through which a coordinated change of IMSI based MSCs selections can be avoided when an MSC for some reason has been changed for one, or particularly a plurality, of mobile stations. Still further a system is needed through which, even if a mobile station moves and changes SGSN attachment from one SGSN to another, it is not necessary to change MSC. Still further a system is needed through which, when there is a change in SGSN for a mobile station already having changed MSC, the SGSN shall have the option to be aware of which is the current MSC. Still further a PS core node is needed through which one or more of the above mentioned objects can be achieved. Moreover a CS core node as initially referred to is needed through the implementation of which one or more of the above mentioned objects can be achieved, as well as a home location node which can assist in achieving one or more of the above mentioned objects. Further yet a method is needed through which one or more of the above mentioned objects can be achieved.

Therefore a communication system as initially referred to is provided in which means are provided for, when there is a change from a first CS core node to which one or more MS(s) is/are attached to second core node, providing, from either of said first or second CS core nodes involved in the change, information to the PS core node to which the MS is attached, with information that a transfer is to be done or has been done. Particularly said means comprises means for providing and sending a message from said first or second CS core node to said PS core node. Particularly said message comprises a message (here denoted a first information message) from said first CS core node indicating the address of said second CS core node. Said message may particularly comprise information about when the PS core node should perform a location update towards said second CS core node for each MS having moved or is going to move from said first to said second CS core node.

In another implementation the first information message comprises a message from said second CS core node, which message comprises the address of said second CS core node itself. Particularly that message is sent after the move (change) from said first CS core node has been effected, and the second CS core node has received information about the address of said PS core node from said first CS core node.

In an advantageous embodiment, when a plurality of mobile stations attached to a first CS core node are moved to, or to be moved to, a second CS core node, information thereon is provided to the PS core node substantially simultaneously, or for a given number or for a particular group of such MSs simultaneously, or consecutively, or according to some algorithm. This is particularly relevant when for example an MSC or a CS core node crashes, is taken down for maintenance or similar, and there may be a large number of MSs being moved to fall under the responsibility of another CS core node.

In a particular embodiment the CS core nodes are MSCs whereas the PS core nodes are Serving GPRS Service Nodes SGSNs and/or Combined GPRS Server Nodes CGSNs. In one implementation the PS core nodes or particularly the SGSNs/CGSNs are not pooled. In that case the inventive concept is extremely advantageous. However, in another implementation also the PS core nodes are pooled.

The first information message is particularly sent over the Gs interface and it should be followed by an acknowledgement from the PS core node to the CS core node having sent said first information message. In order to solve the problem when a mobile station has moved/changed from a first CS core node to a second CS core node, and then subsequently changes PS core node from a first PS core node to a second PS core node due to change of routing area, in which case, unless the inventive concept is implemented, the new PS core node having the IMSI algorithm, e.g. an IMSI table, at hands, and which is fixed for all SGSNs, would select the first CS core node and, in which case, since the MS has changed CS core node, it will no longer be there. In order to solve this problem, second information means are provided for providing a new second PS core node, when an MS (or more) moves from an old first, PS core node to a new, second PS core node, with information about to which CS core node the MS currently is attached or connected. Particularly said second information means comprises a second information message provided and sent from the first, old, PS core node to the second, new, PS core node and it contains information about current CS core node. Said second information message particularly comprises an existing message that already is used in the messaging between PS core nodes, which however is extended with information relating to the current CS core node. As referred to above, the CS core nodes and the PS core nodes may be MSCs and SGSNs/CGSNs respectively. It may comprise an extended message (SGSN Context Response) during an Inter SGSN Routing Area Update. Particularly the current MSC forms part of a pooled group/list of MSC serving the current routing area/service area or location area of the new SGSN. Particularly the new, second, SGSN (or more generally the PS core node) selects the current CS core node or particularly MSC, and sends the message relating to Location Update (Location Update Request) to said current CS core node, or MSC, to avoid changing MSC for the mobile station.

In an alternative implementation said second information means comprises a second information message provided from a home location node, particularly an HLR, to the second, new, PS core node, which information message-comprises information about the current CS core node. Said message particularly comprises an existing message extended with information relating to current CS node. Even more particularly, the CS core node comprises an MSC and the PS core nodes comprise SGSNs/CGSNs, and the existing message comprises an Insert Subscriber Data message in the MAP (Mobile Application Part Protocol). Particularly the second or new PS core node (SGSN) uses information about current MSC to send a Location Update Request to said current MSC (or CS core node) to avoid changing CS core node/MSC for the moving MS. Thus the feature that an HLR holds information about current CS core node is taken advantage of.

In order to achieve one or more of the objects initially referred to the invention also suggests a CS core node which is arranged in a pool of CS core nodes and which is used in a communication system supporting communication of data, further comprising a number of PS core nodes, and wherein an interface (Gs) is used for communication between CS core nodes and PS core nodes, wherein the CS core node comprises means for providing information to a PS core node to which an MS is attached, when said MS changes to/from said CS core node to another CS core node. Said means particularly comprises means for generating and sending a message to said PS core node, and said message contains the address of the other CS core node involved in the CS core node change, i.e. a CS core node to which a change is (to be) performed. Particularly said first information message is sent when an MS is attached to the core node. Alternatively said second information message is sent when an MS has been detached/disconnected from said CS core node or when it is about to detach/disconnect from said CS core node. Said first information message particularly comprises information about when the PS core node should perform a Location Update towards the other CS core node. Particularly the CS core node comprises means for sending a message/messages relating to a plurality or group of MSs changing/having changed PS core node substantially simultaneously. Particularly the CS core node comprises an MSC and said first information message is sent to an SGSN/CGSN comprising a PS core node, wherein said information message is sent over the Gs interface requiring an accept message from the SGSN/CGSN.

The invention also provides for a PS core node used in a communication system supporting communication of data and comprising a number of PS core nodes and further comprising a pool of CS core nodes and wherein an interface (Gs) is used for communication between PS core nodes and CS core nodes. The PS core node comprises means for receiving and responding to an information message from a CS core node when one or more MSs have changed/or are changing CS core nodes and contains the address of the CS core node to which the MS or the MSs are changing/have changed. Particularly said information message is sent/responded to over the Gs interface and comprises information about when the PS core node should perform a Location Update relating to the MS(s) towards the other/new PS core node. The PS core node particularly comprises an SGSN/CGSN receiving an information message from/responding to a CS core node comprising an MSC. The PS core node particularly comprises second information means for sending/receiving a second information message to/from another PS core node to which an MSC moves/attaches or has moved/attached or from which an MS has moved, wherein said second information message contains information about the current CS core node to which the MS is connected/attached. Said second information message even more particularly comprises an existing message extended with information relating to current CS core node, particularly MSC. The extended existing message particularly comprises an extended SGSN context response used during an Inter SGSN Routing Area Update. Particularly, after having received (taken over) an MS from another PS core node, the PS core node selects the current CS core node and sends a location update message to said current CS core node, thus avoiding a CS core node change due to a PS core node change for the mobile station in question.

In order to solve particularly the problem relating to the situation when a mobile station changes from one PS core node to another PS core node and where said other PS core node has to select a CS core node as an alternative, the invention provides for a home location node, e.g. a HLR used in a communication system supporting communication of data and comprising a number of PS core nodes and a number of PS core nodes. The CS core nodes are arranged in a pool and an interface is used for providing information from a PS core node to a CS core node, e.g. the Gs interface and at least the CS core nodes are arranged in a pool. The home location node comprises means for providing and sending an information message (denoted second information message) to a PS core node when an MS has changed attachment from another PS core node to said PS core node, about current attachment/connection of the MS to a CS core node, a current CS core node. Particularly said information message comprises an existing message extended with second information about current CS core node, wherein the existing message particularly comprises an insert subscriber data message as used in existing and standardized systems.

The invention also suggests a method for transfer of information messages in a communication system as initially referred to. The method comprises the steps of, when one or more MSs being attached/connected to a first pooled CS core node are (to be) moved to a second pooled CS core node; providing information in a (first information) message from said first or second CS core node about the address of the second CS core node to the PS core node to which the MS or the MSs is/are connected. Particularly the method comprises the step of using the Gs interface for the message to the PS core node. Still further the method may comprise the steps of, when an MS having changed CS core and the PS core node is aware of the address of the current CS core node, and when the MS subsequently changes PS core node from a first PS core node to a second PS core node, extending an existing message intended for the second PS core node with information about the current CS core node; in a second PS core node, using the information about the current CS core node; selecting said current CS core node to avoid changing CS core nodes for the mobile station(s). Particularly the extended existing message is provided and sent from the old, first, PS core node or alternatively from the home location node holding subscriber data for the mobile station, e.g. a HLR.

BRIEF DESCRIPTION OF THE DRAWINGS

The invention will in the following be further described, in a non-limiting manner, and with reference to the accompanying drawings in which.

DETAILED DESCRIPTION OF THE INVENTION

Figure 2:
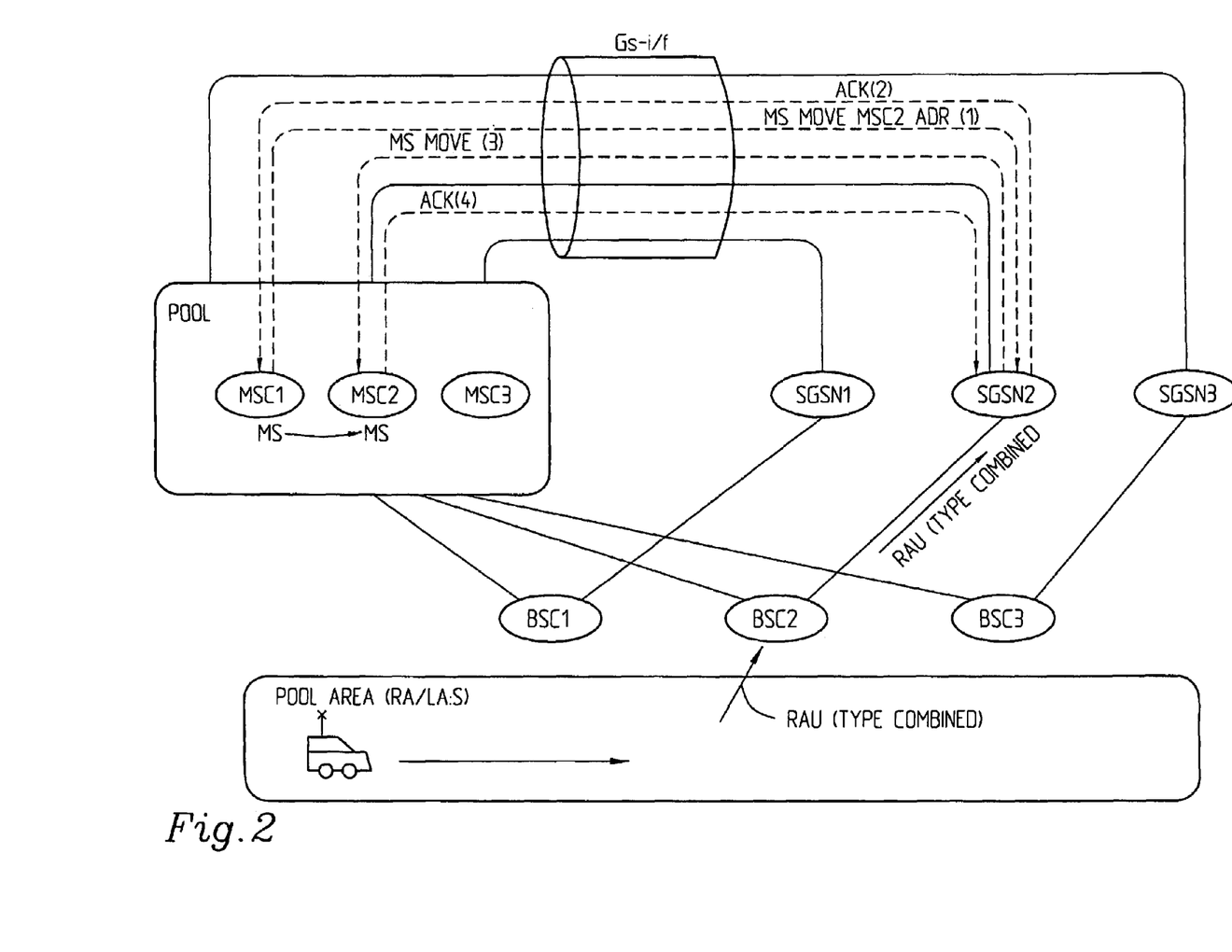
FIG. 2 schematically illustrates a system according the invention and indicating one example of a possible scenario.

FIG. 2 shows a system according to the present invention in which a number of MSCs, MSC 1, MSC 2 and MSC 3 are arranged in a pool, whereas a number of SGSNs, SGSN 1, SGSN 2 and SGSN 3 are provided in a conventional manner, i.e. not in a pool (of course also the SGSNs could have been arranged in a pool). The system implements the standardized feature combined procedures or Network Operation Mode I as referred to above including the Gs interface between the SGSNs and the MSCs. This means that all mobility related signalling passes between the MSs within the pool area (of which only one is illustrated for reasons of clarity) and an SGSN, i.e. SGSN 1, SGSN 2 or SGSN 3, whereas the respective concerned SGSN uses the Gs interface to notify the MSCs or an MSC of the pool of mobility related events of the mobile stations. As referred to above, a selection of an MSC for an MS is performed by the SGSN in such a system instead of by the BSC.

The pool of MSCs in common control BSC 1, BSC 2, BSC 3, i.e. any of the MSCs, MSC 1, MSC 2, MSC 3, is able to control or serve any one of BSC 1, BSC 2 and BSC 3. Of course, in a realistic system there are far more BSCs, and mostly a pool includes more than three MSCs. Since the pooling concept is not (in this implementation) implemented on the SGSN side or on the packet switched side, each SGSN communicates with one BSC or each. BSC only communicates with one SGSN. In this particular embodiment BSC 1 communicates with SGSN 1, BSC 2 with SGSN 2 and BSC 3 with SGSN 3.

FIG. 2 illustrates one scenario in which the problem is solved when an MS is attached to an MSC and changes MSC, e.g. because the MSC is taken down in a planned manner or crashes. SGSN attachment is however not changed. As referred to earlier in the application, an SGSN is here responsible for selection of MSC based on the IMSI of the mobile station. If the SGSN is not pooled or if the SGSN pool area differs from that of the MSC pool, and since for a mobile station the same MSC has to be selected by all the SGSNs in order to avoid an MSC change when there is a SGSN change, with the current solution using the same IMSI algorithm in each SGSN, the same MSC will always be selected. If however an MSC is (taken) down, the SGSN will not be aware of that fact, which means the IMSI algorithm will no more select the appropriate MSC, or an MSC which is in operation. Thus, according to the present invention, means are provided through which the SGSN is notified about the change of MSC for one or more MSs.

In FIG. 2 it is for example supposed that MS is attached to MSC 1, but MSC 1 will be taken down e.g. due to a planned maintenance operation. It is here supposed that MS is transferred to MSC 2. In a first embodiment is supposed that the old MSC, i.e. MSC 1, notifies the SGSN, here SGSN 2, that for MS a change from MSC 1 to MSC 2 will occur. MSC 1 in this implementation thus sends a first information message "MS Move" (1) including the address of MCS 2 to SGSN 2 over the Gs interface. SGSN 2 then responds with an acknowledgment (2) to MSC 1. Subsequently, when a location update is due according to the first message (1), SGSN 2 sends a location update "MS Move" (3) to MSC 2 using the information it received in the first "MS move" message, i.e. the "new" MSC address and information about when the location update was to be performed towards the new MSC 2. MSC 2 then acknowledges (4) this to SGSN 2 also over the Gs interface. It should be clear that the inventive concept is not limited to the use of the Gs interface, the important thing being that the messages are provided and not how.

Generally, when an MS enters or switches on in a pool area, it sends an attach request of type combined to e.g. BSC 2 or a Routing Area Update (RAU) of type combined to BSC 2, which sends a LAU of type combined to SGSN 2 which uses the IMSI algorithm to select an SGSN. However, if not the message "MS Move" according to the present invention is used, and if the MS has changed MSC e.g. due to a maintenance operation or similar, the IMSI based allocation will not work any more since SGSN 2 (in this case) does not know where the MS is attached/connected or which MSC that should be selected; it would still use for example MSC 1 although it is taken down. All SGSNs, according to current state of the art, do have the same IMSI algorithm among others in order to prevent that an MS changes MSC when it changes SGSN. Thus, according to the present invention it can be said that the IMSI based allocation is overridden, and due to the fact that the SGSN has got information about the current MSC, the location update can be sent to the appropriate MSC. This is extremely advantageous since otherwise the algorithms would have to be changed in every SGSN for example at MSC maintenance operations etc.

Figure 3:
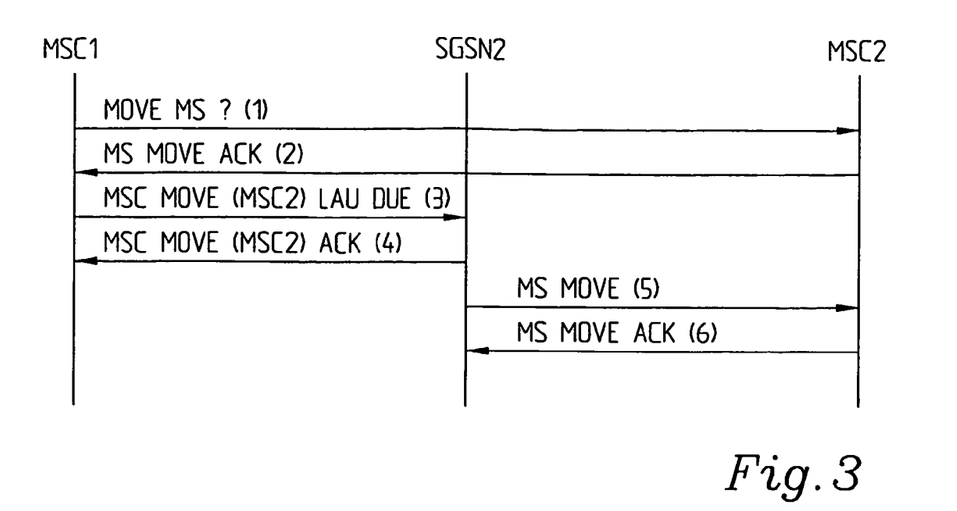
FIG. 3 is a sequence diagram in which a CS core node (an MSC) from which an MS is moved sends a first information message to a PS core node (SGSN)

The scenario of FIG. 2 is schematically illustrated in the sequence diagram of FIG. 3. Thus, it is here supposed that MSC 1 sends a first message Move MS ? (1) to MSC 2 to establish if MSC 2 is capable of accepting the MS. If MSC 2 accepts to receive MS, it sends an acknowledgement MS Move Ack (2) to MSC 1. MSC 1 then sends a first information message according to the present invention, MSC Move, with information about the address of MSC 2 and information about when a location update towards MSC 2 is due, to SGSN 2 (3). This is acknowledged by SGSN 2 to MSC 1 in MSC Move Ack (4). Subsequently, when the location update is due, SGSN 2 sends an MS Move Location Update message (5) to MSC 2, which acknowledges this, MS Move Ack (6), to SGSN 2.

It should be clear that generally an MSC handles a large number of mobile stations and in such a case MSC 1 may send a message relating to a plurality of mobile stations, groups of mobile stations or all mobile stations to for example MSC 2 in one and the same message (on condition they are all moved to MSC 2; otherwise there might be a message to MSC 2, a message to MSC 3 etc. depending on to which MSC a group of MSs are moved). It may also according to any appropriate algorithm send a group within a list to MSC 2, another group to MSC 3 etc. to handle the situation in the most flexible manner with an amount of signalling which is as much reduced as possible. Any variation is in principle possible.

Figure 4:
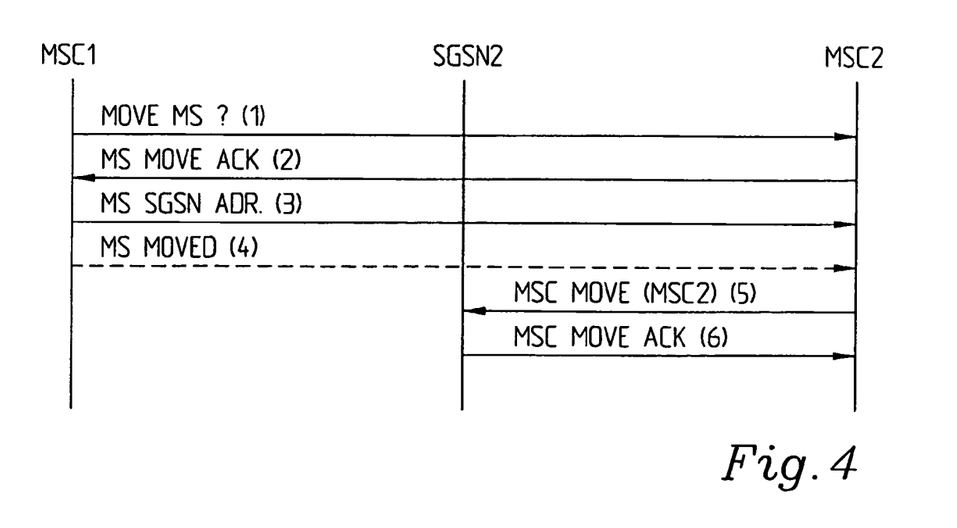
FIG. 4 is a sequence diagram illustrating the procedure when an MSC to which an MS moves informs an SGSN via a first information message.

FIG. 4 shows an alternative implementation of the present invention for informing an SGSN that an MS changes MSC (Of course it is also applicable for a group moved from an MSC etc.) In this case it is supposed that the new MSC, here MSC 2, notifies the SGSN, here SGSN 2, after the MSC change actually has taken place. The only information needed in the information message in this case is the address of the new MSC. However another requirement is that the old MSC, MSC 1, informs the new MSC, here MSC 2, about the address of the relevant SGSN. Thus, in the sequence diagram of FIG. 4, it is supposed that MSC 1 first sends a message move MS ? (1) to MSC 2 to establish if MSC 2 can accept to handle MS (or a group of MSs or all MSs handled by MSC 1). If MSC 2 accepts, it sends a MS move acknowledgement (2) to MSC 1. MSC 1 then sends a message with the address to the relevant SGSN to MSC 2 (3). Of course this information about the SGSN address could have been included already in the first message move MS ? (1) to MSC 2. Subsequently it is supposed that the MS is actually moved indicated through a dashed line (4) in the figure. When the MS has been transferred to MSC 2, MSC 2 sends an MSC move with its address to SGSN 2 (5). SGSN 2 then acknowledges the MS move (6) to MSC 2. Preferably all messages and acknowledgments are sent over the Gs interface. The fact that the old MSC sends the SGSN address to the new MSC actually comprises an addition to the MSC change procedure.

Figure 5:
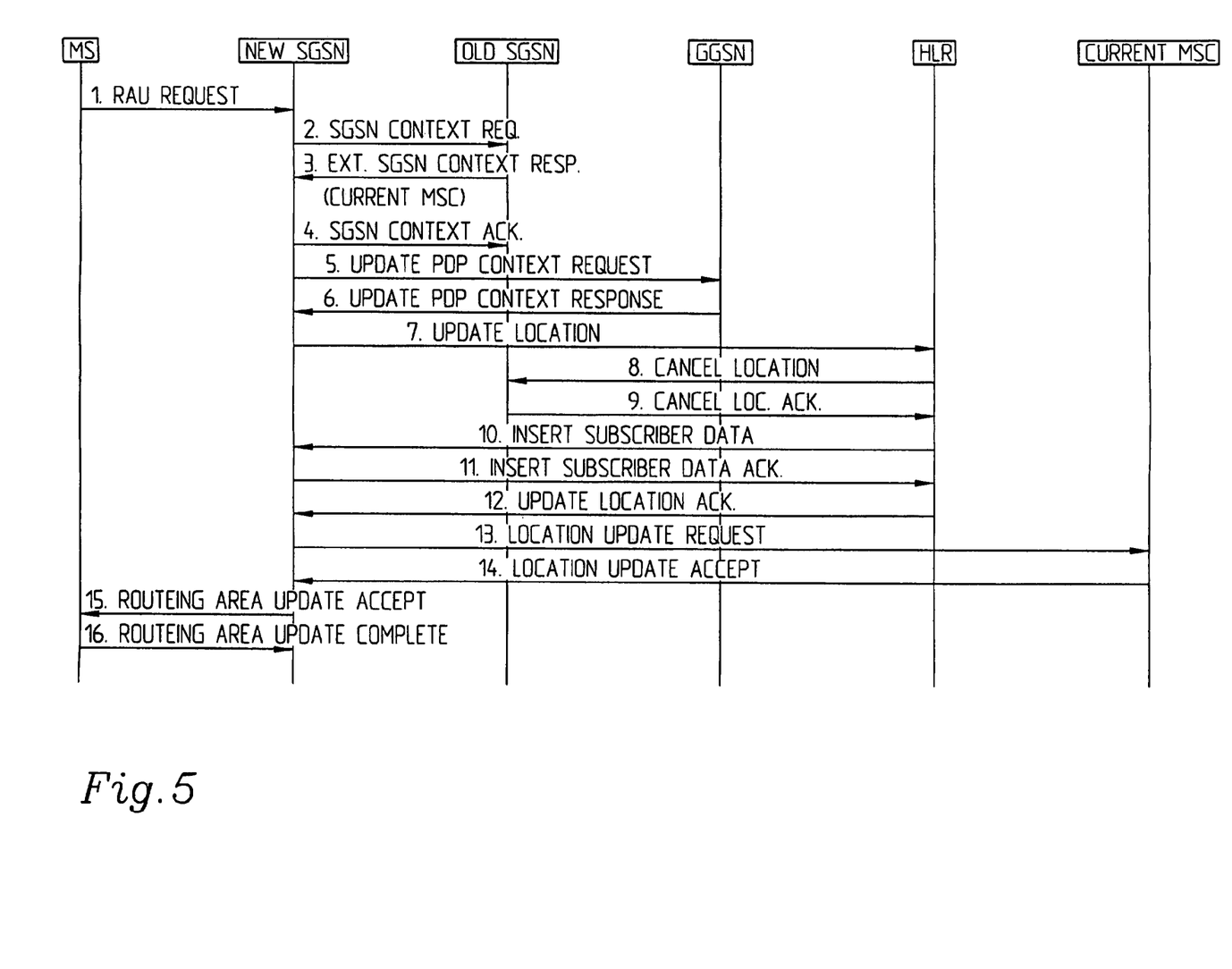
FIG. 5 is a sequence diagram illustrating the procedure when an "old" SGSN provides information to a "new" SGSN via an extended information message in a combined Inter SGSN RA/LA Update message.

FIG. 5 is a sequence diagram relating to a first embodiment according to which the problem is solved when there has been a change of MSCs for an MS (cf. FIGS. 2-4) and when the MS subsequently changes SGSN which then has to select an MSC. It is here supposed that the MSC has notified the SGSN about MSC change e.g. according to the implementation described in FIG. 3. or according to the implementation described in FIG. 4. The implementation illustrated in FIG. 5 is based on an embodiment in which, at Inter SGSN Routing Area Update, the old SGSN includes the MSC address in the SGSN context response message (together with all other MS subscriber data). Preferably the new information elements are optional in order to assure that no interoperability problems occur. If the information is not included, an MSC change will occur, but the service will still be available. This means that an SGSN is free to select any algorithm to select an MSC, since the current MSC is communicated to the new SGSN. FIG. 5 is based on the combined Inter SGSN RA/LA Update in the implementation of the feature combined procedures as described in 3GPP TS 23.060 version 5.2.0, release 5, section 6.9.1.3.2., incorporated herein by reference.

The MS first sends a Routing Area Update Request as is known per se to the new SGSN (1). Update Type preferably indicates combined RA/LA update or if the MS wants to perform an IMSI attach, combined RA/LA update with IMSI attach requested. Subsequently the new SGSN sends an SGSN Context Request (2) to the old SGSN, among others to get the PDP contexts for the mobile station. The old SGSN thereupon sends an SGSN Context Response which however, according to the present invention, is extended with information about the current MSC to which the MS is connected (3). This information is new. The new SGSN subsequently sends an SGSN Context Ack (4) to the old SGSN. Later the new SGSN sends an Update PDP Context Request (5) with the new SGSN Address TEID, QoS Negotiated to the concerned GGSN (Gateway GPRS Support Node) and the GGSN update their PDP context fields and return an Update PDP context Response (TEID) (6).

The new SGSN sends an Update Location to HLR to inform the HLR of the change of SGSN by sending Update Location with SGSN Number, SGSN Address, IMSI (7). The HLR then sends a Cancel Location with IMSI, Cancellation Type, to the old SGSN (8). The old SGSN acknowledges this with Cancel Location Ack (IMSI) (9). HLR sends Insert Subscriber Data (IMSI, GPRS Subscription Data) (10) to the new SGSN which validates the presence of the MS in the (new) RA. It is here supposed that the MS is allowed to be attached in the RA in question and the new SGSN returns an Insert Subscriber Data Ack (IMSI) message to HLR (11). The HLR acknowledges the Update Location by sending Update Location Ack (IMSI) to the new SGSN (12). Since the new SGSN has been provided with information about current MSC, it directly sends a Location Update Request to current MSC (13), which, if it accepts, returns a Location Update Accept (14), to the new SGSN. As can be seen here a lot of messaging and signalling is avoided due to the fact that new SGSN already in message (3) was informed about current MSC. Finally the new SGSN validates the presence of the MS in the new RA. It is supposed that the MS is allowed to be attached in the RA and subscription requirements are met and thus the new SGSN establishes MM and PDP context for the MS and a logical link is established between the new SGSN and the MS.

The new SGSN responds to the MS with a Routing Area Update Accept with P-TMSI, VLR TMSI, P-TMSI Signature etc. (15). The MS then confirms the reallocation of the TMSIs by returning a Routing Area Update Complete to the new SGSN (16). The new SGSN then sends a TMSI Reallocation Complete message to the new VLR if the MS confirms the VLR TMSI. This is however not shown in the figures since it is of no relevance for the present invention.

Thus, FIG. 5 describes one way of providing an extended, existing message with information such as to achieve the object of the invention and to reduce signalling and prevent unnecessary MSC changes (upon an SGSN change).

Figure 6:
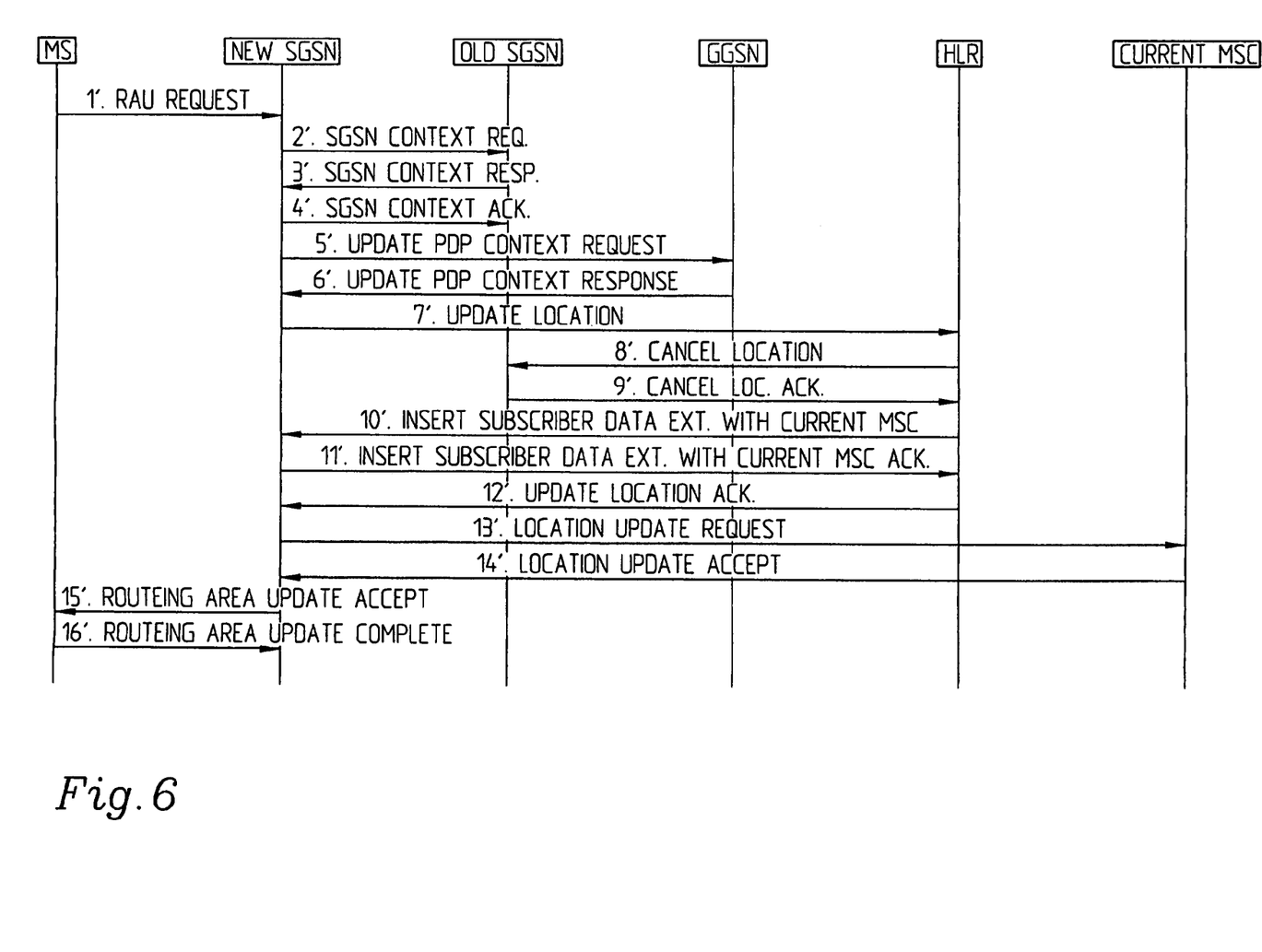
FIG. 6 is a sequence diagram similar to that of FIG. 5 for an embodiment in which the second information message is provided from an HLR.

FIG. 6 shows another implementation of the invention which is an alternative to the implementation described in FIG. 5. In this case it is the HLR that provides the information about current MSC. During attach and Inter SGSN Routing Area Update, when the SGSN receives insert subscriber data from the HLR, the HLR includes the address of the MSC where the MS currently is attached (if one is available). If this MSC is one of the MSCs which are pooled as known to the SGSN, this MSC will be used for the combined procedures and an MSC change is avoided for the MS. Actually both these implementations have as a consequence that an SGSN is free to chose any algorithm to select MSC, since the current MSC is communicated to the new SGSN. In FIG. 6 signals 1-9 correspond to those of FIG. 5 with the exception that in message 3' current MSC information is not included. However, instead in the insert subscriber data message 10' from HLR to the new SGSN, this message is extended with the information about the current MSC, with subsequently is acknowledged in a message 11' from the new SGSN to HLR.

Thus, the HLR notifies the SGSN of the MSC where the MS is attached. This actually comprises an update to the Insert Subscriber Data message in MAP (Mobile Application Part), 3GPP TS 29.002 which herewith is incorporated herein by reference. Upon receiving the MSC address the SGSN can send the Location Update Request message to the MSC where the MS already is attached. One requirement for the SGSN to use this MSC is that the MSC belongs to the list of MSCs (pooled) that served the current RA/LA. The other messages than the one particularly discussed above correspond to those in FIG. 5. Thus, messages 1',2', 4'-9' and 11'-16' corresponds to messages with the same references in FIG. 5).

In still another advantageous implementation of the invention the SGSN is provided with a monitoring function of all configured MSCs of the pool in order to detect an MSC failure. Then the SGSN can send all new MSs or redistribute MSs to the restarted, or another, MSC when it is available. In order to make the monitoring function work, either of the suggestions provided in FIGS. 3,4 or 5,6 has to be implemented, or a combination thereof. When an MS has been redistributed, it will be attached to a new MSC, which means that when the MS changes SGSN, e.g. at an Inter SGSN Routing Area Update, the new SGSN is able to find the MSC to which the MS is connected.

It should be clear that the invention of course not is limited to the specifically illustrated embodiments, but that it can be varied in a number ways without departing from the scope of the appended claims.

The invention claimed is:

1. In a communication system comprising pooled circuit switched core network nodes and packet switched (PS) core network nodes, a method of transferring a mobile station (MS), the method comprising the steps of:
    moving the MS from a first pooled CS core network node to a second pooled CS core network node;
    sending a first message from the first pooled CS core network node to the second pooled CS core network node to establish if the second pooled core network node will accept the MS; and
    sending a second message from the first pooled CS core network node to a first PS core network node upon the second pooled core network node accepting the MS, the second message including the address of the second pooled CS core network node and information regarding a location update to the second pooled CS core network node, whereupon the first PS core network node sends a location update to the second pooled CS core network node according to the information in the second message.

2. The method of claim 1, wherein the pooled CS network node is a Mobile Switching Center (MSC) and the first PS network node is a Serving GPRS Support Node (SGSN) or a Combined GPRS Support Node (CGSN).

3. The method of claim 1, wherein the first message includes a plurality of mobile stations moving from the first pooled CS core network node to the second pooled CS core network node.

4. The method of claim 1, wherein the first message includes a list of mobile stations moving to the second CS network node and a list of mobile stations moving to a third CS core network node.

5. The method of claim 1, wherein the information regarding a location update includes the time the first PS core network node shall perform a Location Update for the MS towards said second CS core network node.

6. The method of claim 1, wherein all messages between the CS core network nodes and the first PS core network node are sent via a Gs interface.

7. The method of claim 1, wherein the first core network node is one of a pool of PS core network nodes.

8. The method of claim 7, wherein the MS changes to a second PS core network node from the first PS core network node, a second information message is sent from the first PS core network to the second PS core network node, the second information message containing information about the second CS core network node.

9. The method of claim 8, wherein the second information message is an existing message, which is extended to include the information about the second CS core network node.

10. The method of claim 9, wherein the extended message is a SGSN Context Response sent during an Inter SGSN Routing Area Update.

11. A node in a communication system comprising pooled circuit switched (CS) core network nodes and packet switched (PS) core network nodes, the node comprising:
    means for moving a connected MS from a first pooled CS core network node to a second pooled CS core network node;
    transmission means for sending a first message from the first pooled CS core network node to the second pooled CS core network node to establish if the second pooled core network node will accept the MS; and
    means for sending a second message from the first pooled CS core network node to a first PS core network node upon the second pooled core network node accepting the MS, the second message including the address of the second pooled CS core network node and information regarding a location update to the second pooled CS core network node, whereupon the first PS core network node sends a location update to the second pooled CS core network node according to the information in the second message.

12. The node of claim 11 is one of a CS core network node and a PS core network node.

13. The node of claim 12, wherein the pooled CS network nodes are Mobile Switching Centers (MSCs) and the first PS network node is a Serving GPRS Support Node (SGSN) or a Combined GPRS Support Node (CGSN).

14. The node of claim 12, wherein the first message includes a plurality of mobile stations moving from the first pooled CS core network node to the second pooled CS core network node.

15. The node of claim 12, wherein the first message includes a list of mobile stations moving to the second CS network node and a list of mobile stations moving to a third CS core network node.

16. The node of claim 12, wherein the information regarding a location update includes the time the first PS core network node shall perform a Location Update for the MS towards said second CS core network node.

17. The node of claim 12, wherein all messages between the CS core network nodes and the first PS core network node are sent via a Gs interface.

18. The node of claim 17, wherein the first PS core network node is one of a pool of PS core network nodes.

19. The node of claim 18, wherein if the MS changes to a second PS core network node from the first PS core network node, a second information message is sent from the first PS core network node to the second PS core network node, the second information message containing information about the second CS core network node.

20. The node of claim 19, wherein the second information message is an extension of an existing message, which is extended to include the information about the second CS core network node.

21. The node of claim 19, wherein the extended message is a SGSN Context Response sent during an Inter SGSN Routing Area Update.

* * * * *